United States Patent [19]

Schlapmann et al.

[11] 3,841,447
[45] Oct. 15, 1974

[54] SELF-ACTUATING BRAKE

[75] Inventors: William J. Schlapmann, Winneconne; Dale Manteufel, Hortonville, both of Wis.

[73] Assignee: J. I. Case Company, Racine, Wis.

[22] Filed: May 16, 1973

[21] Appl. No.: 360,727

[52] U.S. Cl. .............................................. 188/77 R
[51] Int. Cl. ........................................... F16d 49/00
[58] Field of Search........... 188/77 R, 77 W; 192/80

[56] References Cited
UNITED STATES PATENTS 1,464,761    8/1923    Hardin .............................. 188/77 R

*Primary Examiner*—Duane A. Reger

[57] ABSTRACT

A self-actuating brake mechanism including a flexible brake band having a center portion received around the brake drum and having free ends connected to the braking mechanism of this invention. The improved brake mechanism is self-actuating in both directions of rotation of the brake drum. The brake actuating mechanism includes a pair of levers, each having a fixed pivot axis and a pivotal connection to a common link. The free ends of the band are each pivotally connected to one of the levers between the fixed pivot axis and the common link connection. The brake is actuated by pulling or tensioning the common link member. The brake linkage also includes a stop means which permits rotation of the levers only in a direction which tensions the brake band ends. The friction of braking tensions the pivotal connection of the band to one of the levers, which is fixed by the stop means. The opposed lever rotates about its fixed axis, upon actuation of the brake, to tension the opposed end of the brake band in the direction of rotation of the drum, providing a self-actuating braking action. In the preferred embodiment of the brake mechanism, the pivotal lever connections define a triangular relation which provides a mechanical advantage to braking. In the disclosed embodiment, the levers cross with the common link located between the fixed pivot axes of the levers.

27 Claims, 4 Drawing Figures

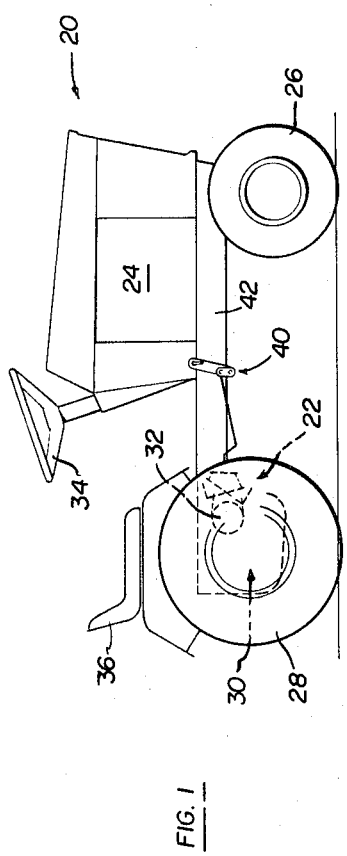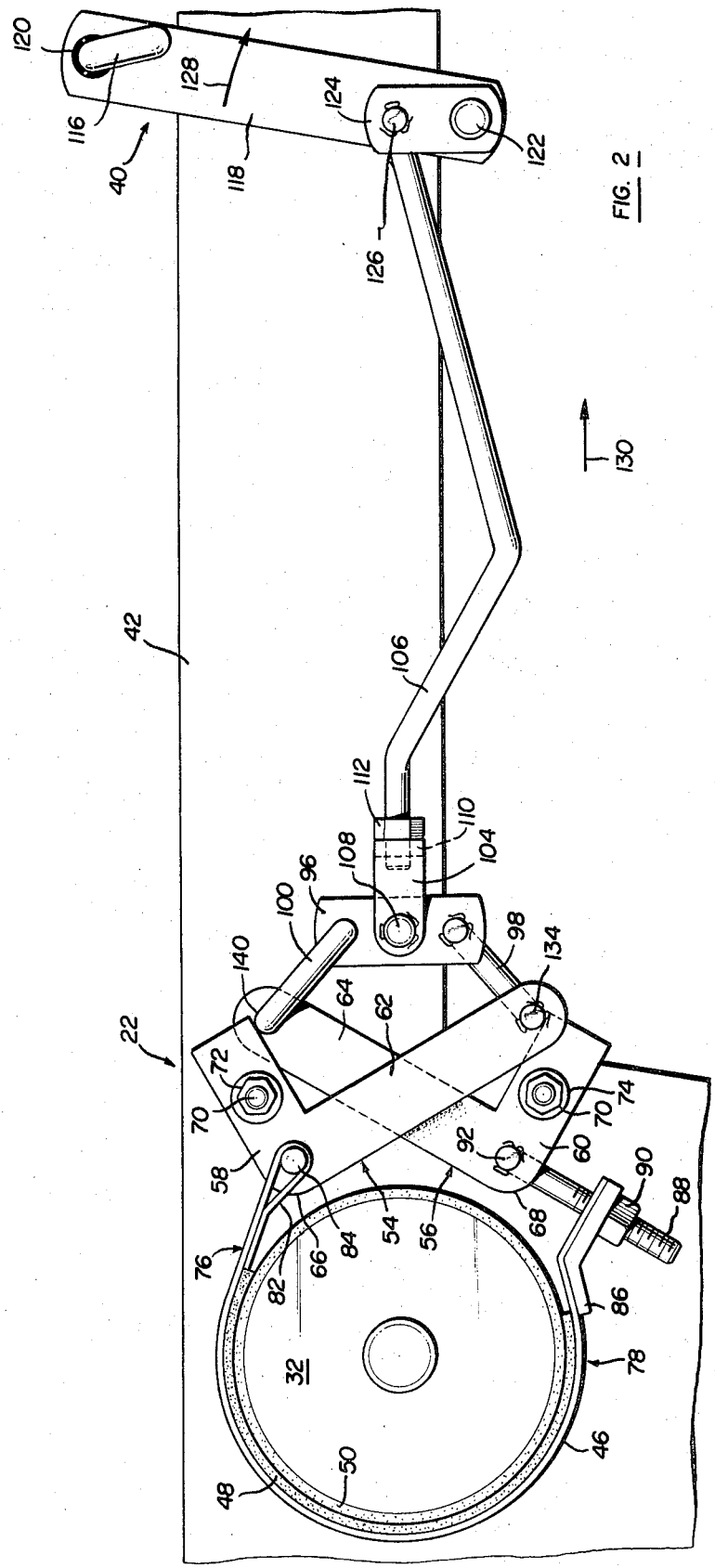

SELF-ACTUATING BRAKE

FIELD OF THE INVENTION

The brake mechanism of this invention relates to self-actuating band brakes, particularly for vehicles such as compact tractors and other small vehicles. The brake band is tensioned around the rotating drum to brake the vehicle.

DESCRIPTION OF THE PRIOR ART

The conventional braking mechanism for a small or compact tractor includes a flexible brake band which frictionally engages the brake drum, stopping the drum and the vehicle. The brake band is generally fixed at one end by a pin to the tractor chassis and the opposed end is tensioned around the drum by the brake linkage connected to a brake pedal, or the like. The band and drum of the conventional brake mechanism are subject to uneven wear because one end of the band is fixed. The band may also fail in reverse because the band is normally tensioned only against the forward motion of the drum.

Various attempts have been made to provide a double-acting mechanism for tensioning the brake band, however the prior art mechanisms are generally complex and subject to failure. The self-actuating brake mechanism of this invention is relatively simple in design and is self-actuating in both directions of rotation of the brake drum, to assure equal braking in forward and reverse and assure even wear of the drum and brake band.

SUMMARY OF THE INVENTION

The self-actuating band brake of this invention includes a flexible brake band which is received around a conventional brake drum of a vehicle, such as a tractor, and a brake actuator means which tensions the band around the drum to brake the vehicle. The brake actuator means includes a pair of levers each having a fixed pivot axis and a pivotal connection to a common link adjacent the opposed end. The free ends of the brake band are each pivotally connected to one of the levers, between the fixed pivot axis and the pivotal connection to the common link. The brake mechanism would normally include a brake pedal, a brake pedal linkage and a connecting rod interconnecting the common link and the pedal linkage, whereby actuation of the brake pedal pulls or tensions the common link and utilizes the mechanical advantage of the levers to tighten the brake band around the drum.

The preferred brake mechanism of this invention also includes a stop means which assures self-actuation of the brake in either direction of rotation of the brake drum. The stop means prevents rotation of the levers toward the brake band, fixing the following end of the band upon frictional engagement, and permitting rotation of the levers in the opposite direction, tensioning the exit or leading end of the band in a self-actuating direction. In either direction of rotation of the drum, the following end of the brake band is fixed and the leading end is tensioned upon actuation of the brake. In the disclosed embodiment, the linkage itself provides the stop means described hereinbelow.

In the preferred embodiment of the brake mechanism, the fixed pivot axis and pivotal connections of the levers define a triangle with the distance between the fixed pivot axis and the pivotal connection to the common link being greater than the distance between the fixed pivot axis and the pivotal connection to the brake band, thereby providing a greater mechanical advantage for tightening the brake band around the drum. In the disclosed embodiment, the levers are L-shaped, having one short arm between the fixed pivot axis and the pivotal connection to the brake band and the common link member and a longer arm joined at an apex. The stop means in the disclosed embodiment is provided by links which interconnect the levers and the common link. The connector links abut the short arm of the opposed lever and prevent rotation of the levers toward the drum, as described above. The long arms in the disclosed embodiment of the braking mechanism cross opposite the axis of the brake drum and the common link is located between the fixed pivot axes of the levers. The levers are pivotally connected to the common link by link connectors, each connector pivotally connected at one end to one of the levers and to the common link at the opposed end.

The brake band is tensioned around the brake drum to frictionally engage the drum by pulling or tensioning the common link member. The common link may be connected to the brake pedal by a brake rod or other suitable means, as described above. The levers are balanced on the common link and pivot around the fixed axis. The pivotal connections of the levers to the common link in the disclosed embodiment are spaced on the link and the link is pivotally connected to the brake rod between the pivotal connections, such that the common link will automatically adjust angularly to compensate for the direction of braking, as will be described hereinbelow.

Other advantages and meritorious features of the disclosed invention will more fully appear from the following description of the preferred embodiment, the appended claims and the drawings.

BRIEF DESCRIPTION OF THE DRAWING

FIG. 1 is a side view of a conventional compact tractor having the improved, self-actuating braking mechanism of this invention;

FIG. 2 is a side view of one embodiment of the improved self-actuating braking mechanism of this invention;

DESCRIPTION OF THE PREFERRED EMBODIMENT

Figure 3:
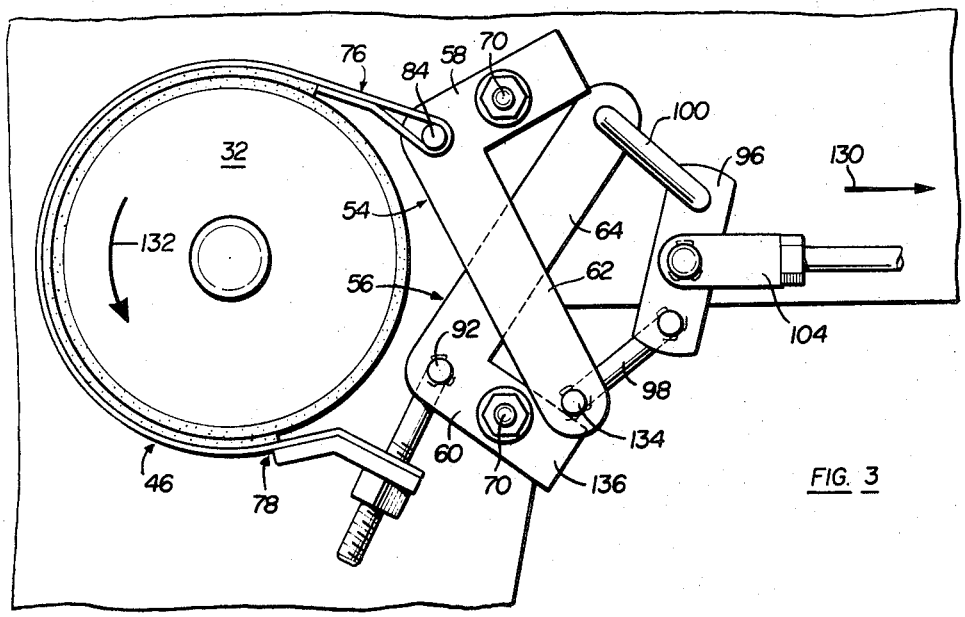
FIG. 3 is a side view of the embodiment of the self-actuating brake mechanism shown in FIG. 2 during braking, when the brake drum is rotating in a counter-clockwise direction.

FIG. 1 illustrates a conventional tractor 20, such as a compact lawn or garden tractor, which may be utilized to pull various implements, such as garden plows, lawn mowers or sweepers. The tractor includes one embodiment of the improved self-actuating brake mechanism 22 of this invention, which will be described hereinbelow. The tractor normally includes a motor 24, a pair of forward wheels 26 and rearward wheels 28. The rear wheels may be driven by a conventional transmission 30 and in this embodiment the tractor includes an off-set brake drum, indicated in phantom at 32. The tractor normally includes a steering wheel 34, which is operated from a driver's seat 36.

The details of the compact tractor illustrated in FIG. 1 are not claimed as the invention herein, except for the self-actuating brake mechanism disclosed hereinbelow. The brake mechanism disclosed in FIG. 1 includes a side mounted brake pedal and linkage, indicated generally at 40, which is mounted on the tractor chassis 42. The details of the brake mechanism are shown in FIG. 2.

The preferred brake mechanism 22 includes a flexible brake band 46 having a friction lining 48 which encircles the brake drum 32 and frictionally engages the friction surface 50 of the drum. The brake lining 48 and the friction surface 50 of the drum may be formed of any suitable material, such as asbestos or various composition materials known in the art. The brake band 46 and lining are preferably relatively flexible to encircle the drum, as shown, but are sufficiently self-supporting to release the drum upon release of the brake mechanism 22, as described below.

The brake mechanism in the disclosed embodiment includes two L-shaped levers 54 and 56. Each lever 54 and 56 has a short arm, 58 and 60 respectively, and a relatively long arm, 62 and 64 respectively; the arms are joined at an apex, 66 and 68 respectively. The levers are pivoted or rotatably secured to the chassis 42 of the tractor on a pair of fixed pivot axes 70, including lock nuts 72 and washers 74. The levers in the disclosed embodiment are flat and washers may be provided between the chassis and the levers to assure free pivotal motion.

The free ends 76 and 78 of the flexible brake band are each pivotally connected to the levers adjacent the apex 66 and 68, respectively, as follows. One free end 76 of the band includes a loop 82 which is pivotally received on a pivot pin 84; the pin may be integral with the lever 54. The opposed free end 78 of the band has an adjustable clamp, including reinforcing plate 86, which receives a threaded L-shaped bolt 88 and lock nut 90. The L-shaped end 92 of the bolt 88 is pivotally secured to the apex 68 of the lever 56 by any suitable means, such as the cotter pin shown. The threaded end of the bolt is received through the reinforcing plate 86 and adjustably secured by lock nut 90.

The long arms 62 and 64 of the L-shaped levers are pivotally connected to a toggle or common link 96 by C-shaped connector links, 98 and 100 respectively, as shown in FIG. 2. The ends of the connector links are received in apertures in the toggle link 96 and the levers and may be secured by any suitable means, such as the cotter pins shown.

The common or toggle link 96 in the disclosed embodiment is pivotally connected to the brake pedal linkage 40 by a clevis 104 and a brake rod 106. The clevis 104 includes a bifurcated end which is received over the flat common link 96 and secured by a pivot pin 108. The end 110 of the brake rod 106 is threaded and secured in the threaded aperture of the clevis by nut 112. The pivot pin 108 may be secured in place by any suitable means, such as the cotter pin shown.

The brake pedal and linkage assembly 40 in the disclosed embodiment includes a brake pedal 116, which may be merely an L or U-shaped rod and which is privotally received and secured in the first link 118 of the brake pedal linkage 40. The first link 118 is pivotally secured to the tractor chassis on a fixed pivot pin 122. A second link 124 in the disclosed embodiment is rigidly secured to the first link 118, defining a bellcrank linkage assembly. The L-shaped end 126 of the brake rod 106 is pivotally received within an aperture in the second link 124 and secured with a cotter pin or the like, as shown.

The operation of the self-actuating brake mechanism of this invention will be more fully understood from the following description, first referring to FIG. 2. When the brake is actuated by depressing or urging the brake pedal 116 forward, the main or first pedal link 118 is pivoted or rotated about the fixed pivot pin 122, in the direction of arrow 128. The second, smaller link 124, which is fixed to the first link, is also rotated in the same direction, pulling or tensioning the brake rod 106 in the direction of arrow 130. The difference in length of the first and second links, 118 and 124 respectively, provides a mechanical advantage to the braking force, as will be understood by those skilled in the art. The movement of the brake rod 106, in the direction of arrow 130, will draw or pull the common or toggle link 96 in the same direction. This movement will tend to pivot or rotate the levers 54 and 56 about their pivot axes to tension the brake band 46 around the drum 32 in a self-actuating direction, as described below in regard to FIGS. 3 and 4.

The brake drum 32 in FIG. 3 is rotating in a counterclockwise direction, as shown by arrow 132. The brake drum in the disclosed embodiment of the tractor 20 has an off-set brake drum 32 which rotates in a direction opposite to the rotation of the wheels. The drum will then rotate counterclockwise when the vehicle is moving forward. The brake mechanism of this invention however operates equally efficiently in both directions, as will be described below.

The friction of braking tensions or pulls the "following" end 76 of the band 46, tensioning the pivotal connection 84 to lever 54. The tension on the pivot 84 will tend to rotate lever 54 in a clockwise direction, around its fixed pivot axis 70. Clockwise rotation of the lever 54 would however relieve the tension in the brake band 46, but is prevented from rotating by connector link 98. The end 134 of the C-shaped connector link 98 abuts the extension 136 of lever 56 and secures or fixes the following end 76 of the brake band. The end 134 of the connector link then serves as a stop means preventing rotation of the lever 54 in a clockwise direction and fixes the end 76 of the brake band when the drum 32 is rotating in a counter-clockwise direction. The "leading" or exiting end 78 of the brake band is simultaneously tensioned in a self-actuating direction by lever 56. Upon action of the brake, lever 56 rotates in a clockwise direction about its fixed pivot axis 70, as shown in FIG. 3, to tension the brake band around the drum 32. The tension on the toggle link 96, as shown by arrow 130, is transmitted through connector link 100 to rotate the lever 56 in a clockwise direction, tensioning the brake band in a self-actuating direction. The toggle link 96 automatically adjusts angularly to compensate for the direction of braking, as shown.

Figure 4:
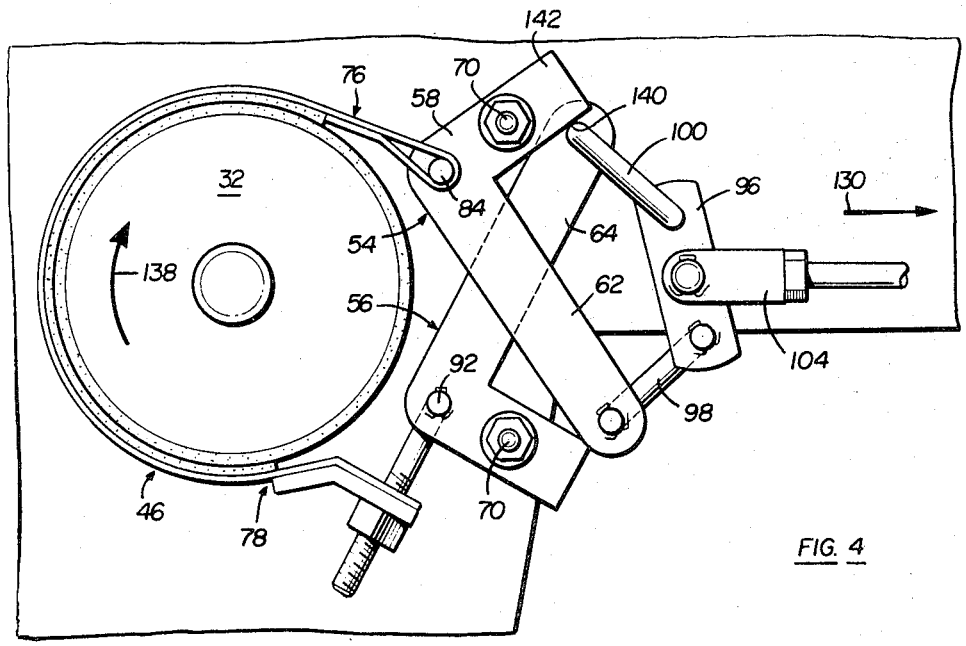
FIG. 4 is a side view of the embodiment of the self-actuating braking mechanism when the drum is rotating in a clockwise direction.

The brake drum 32 in FIG. 4 is rotating in a clockwise direction, as when the tractor 20 is moving in reverse. It will be seen that the braking action in FIG. 4 is a mirror image of the action shown in FIG. 3. The following end of the brake band is now end 78, which tensions pivot 92, tending to rotate lever 56 in a counterclockwise direction. This motion is prevented by the end 140 of the C-shaped connector link 100, which abuts the extension 142 of lever 54. The following end 78 of the brake band 46 is then fixed, as described above in relation to FIG. 3, and the lever 56 is prevented from rotating toward the drum 32.

The leading or exiting end 76 of the brake band is simultaneously tensioned in a self-actuating direction by lever 54, as described above. Lever 54 rotates in a counter-clockwise direction about its fixed pivot axis 70, as shown in FIG. 4, to tension the brake band around the drum. As described above, the tension on the toggle link 96, as shown by arrow 130, is transmitted through connector link 98 to rotate the lever 54 in a counter-clockwise direction, tensioning the brake band in a self-actuating direction. The toggle link 96 adjusts angularly to compensate for the direction of braking, wherein the lower end of the toggle link is extended toward the brake pedal linkage 40. Conversely, in FIG. 3, the upper end of the toggle link 96 was extended toward the brake pedal linkage 40.

It will be noted from FIGS. 2 to 4 that the pivotal connections of the levers 54 and 56 define a triangle, wherein the distance between the fixed pivot axes 70 and the pivotal connections to the common link, 134 in lever 54 and 140 in lever 56, is greater than the distance between the fixed pivot axes 70 and the pivotal connection to the brake band, 84 in lever 54 and 92 in lever 56. This relation provides a second mechanical advantage to braking, which is particularly important in a manual brake, as disclosed. The free ends of the brake band are thus pivoted on a smaller arc than the pivotal connections 134 and 140.

Release of the brake pedal 116 releases the first pedal link 118, which may be spring actuated (not shown), returning the brake linkage to its normal ready operating position. It is important to note that the common link 96 is free to float or angularly adjust to the direction of braking, as described above. The brake band 46 may be easily adjusted initially and for wear by threading the lock nut 90 on the L-shaped bolt 88. The freedom of rotation of the levers 54 and 56 is adjusted by tightening or loosening the lock nuts 72 and the tension of the brake rod 106 may be adjusted by nut 112. FIG. 2 illustrates the preferred adjustment of this embodiment of the self-actuating brake mechanism with the pedal 116 in the neutral position, wherein the levers are prevented from rotating toward the brake drum.

The self-actuating brake mechanism of this invention thus provides a relatively simple manual brake, particularly for small vehicles such as lawn or garden tractors, which is equally efficient in braking the vehicle in forward and reverse. Further, the braking mechanism of this invention will reduce uneven lining and drum wear. The crossing lever design not only results in a desired compact linkage, but also provides a substantial mechanical braking advantage which is necessary for manual braking systems. The elements of the disclosed linkage may be easily fabricated out of various materials including iron and steel and the mechanism may be assembled and adjusted, as required.

We claim:

1. A self-actuating band brake for vehicles and the like, comprising: a flexible brake band having a center portion received around a rotatable brake drum and having opposed free ends, a pair of levers, said levers having spaced fixed pivot axes and each lever having a pivotal connection to a brake actuating means, said brake actuating means adapted to tension said pivot connections upon actuation of the brake, said opposed free band ends each pivotally connected to one of said levers, between said fixed pivot axis and said pivotal connection, and a stop means preventing rotation of said levers about said fixed pivot axis in the direction of rotation of the drum which would relieve the tension on said band ends and permitting rotation in the opposite direction, whereby the friction of braking in one direction tensions the pivotal connection of said band to one of said levers which is fixed by said stop means and the opposed lever rotates about its fixed pivot axis upon actuation of said brake to tension the opposed end of said brake band around said drum and brake the vehicle.

2. The self-actuating band brake defined in claim 1, characterized in that said fixed pivot axes and said pivotal connections of said levers define a triangle with the first leg of said triangle defined between said fixed pivot axis and said pivotal connection to said band, said first leg extending generally toward the axis of said drum when said brake is in the relaxed position.

3. The self-actuating band brake defined in claim 2, characterized in that the second leg of said triangle, defined between said fixed pivot axes and said pivotal connection to said brake actuating means is longer than said first leg.

4. The self-actuating band brake defined in claim 2, characterized in that said levers are L-shaped, each lever having a relatively short arm and a longer arm joined at an apex, said free band ends pivotally connected to said levers adjacent said apex.

5. The self-actuating band brake defined in claim 4, characterized in that said longer arms of said levers cross and are pivotally connected at spaced locations to a common link located between said pivot axes.

6. The self-actuating band brake defined in claim 5, characterized in that said common link is pivotally connected to said levers at spaced locations and said common link is pivotally connected to said brake actuating means between said spaced locations, whereby said common link automatically adjusts angularly to compensate for the direction of braking.

7. The self-actuating band brake defined in claim 6, characterized in that said common link is pivotally connected to the longer leg of said levers by a pair of links each of which abut the short leg of the opposed lever and providing said stop means preventing rotation of said levers in a direction which relieves the tension on said band ends.

8. The self-actuating band brake defined in claim 1, characterized in that said levers are pivotally connected to a common link at spaced locations by a connector link which abuts the opposed link, preventing rotation in said one direction and providing said stop means.

9. The self-actuating band brake defined in claim 8, characterized in that said levers are L-shaped, each lever having a longer arm pivotally connected to said common link and a shorter arm having said fixed pivot axis.

10. The self-actuating band brake defined in claim 9, characterized in that said longer arms of said levers cross and said common link is located between said fixed pivot axes.

11. The self-actuating band brake defined in claim 10, characterized in that said shorter arms of said levers each include an extension beyond said fixed pivot axis which abut said connector links and preventing rotation in said one direction, providing said stop means.

12. A self-actuating band brake for vehicles and the like, comprising: a flexible band brake having opposed free ends and a center portion wrapped around a rotatable brake drum, a pair of levers, said levers having fixed pivot axes in spaced relation adjacent said free band ends and spaced pivotal connections to a common link, located between said fixed pivot axes, each free end of said band having a pivotal connection to one of said levers, between said pivot axes and said pivotal connections, said fixed pivot axes and pivotal connections of each of said levers defining a triangle with the first leg of said triangle defined between said fixed pivot axis and said pivotal connection to said band end extending generally toward the axis of said drum when the brake is in the relaxed position and the second leg of said triangle defined between said pivotal connections being greater in length than said first leg, and a stop means adapted to prevent rotation of said levers about said fixed pivot axes toward said drum and permitting rotation away from said drum which tensions said band, and a brake linkage means adapted to tension said common link upon actuation of said brake, whereby the actuation of said brake tensions said common link and said pivotal connections of said levers to cause said band to frictionally engage said drum, the frictional braking of said band in one direction tensioning one pivotal connection to one lever, which is fixed by said stop means and the opposed lever rotating to tension the opposed end of said brake band, providing a self-actuating braking mechanism.

13. The self-actuating band brake defined in claim 12, characterized in that the pivotal connections to said common link are spaced and said brake linkage means is pivotally connected to said common link between said pivotal connection, whereby said common link automatically adjusts angularly to compensate for the direction of braking.

14. The self-actuating band brake defined in claim 12, characterized in that said levers are L-shaped, each lever having a longer arm between said pivotal connections and a shorter arm between said fixed pivot axis and said pivotal connection to said free band end.

15. The self-actuating band brake defined in claim 14, characterized in that said longer arms of said levers cross and said common link is located between said fixed pivot axes.

16. The self-actuating band brake defined in claim 15, characterized in that said longer arms of said levers are joined to said common link by pivotally connected connector links which abut said shorter arms of the opposed link and prevent rotation of said levers toward said drum, providing said stop means.

17. The self-actuating band brake defined in claim 16, characterized in that said shorter arms include an extension beyond said fixed pivot axes which abut said connector links.

18. The self-actuating band brake defined in claim 14, characterized in that said arms are joined at an apex and said free ends of the brake band are each pivotally connected to one of said arms adjacent said apex.

19. The self-actuating band brake defined in claim 18, characterized in that said apex is located adjacent said free ends of said brake band and said shorter arms extend toward the axis of said drum when said brake is in the relaxed position.

20. The self-actuating band brake defined in claim 19, characterized in that said stop means comprises a pair of connector links each pivotally connecting one of said longer arms of said levers to said common link and abutting the shorter arm of the opposed links.

21. A self-actuating band brake for vehicles and the like, comprising: a flexible brake band for receipt around a conventional brake drum, a pair of L-shaped levers, each lever having a relatively short arm extending generally toward said drum and the longer arm, said arms joined at an apex adjacent the ends of said brake band, each lever having a fixed pivot axis in said short arm and a pivotal connection to a common link adjacent the end of said longer arm, said brake band having a center portion wrapped around said drum and opposed free ends, each of said free band ends pivotally connected to one of said levers adjacent said apex, a stop means preventing rotation of said levers about said fixed pivot axes towards said band ends, and a brake actuating means adapted to tension said common link away from said brake drum to tension said band around said drum, whereby the frictional braking of said band in one direction tensions the pivotal connection of said band to one of said levers, which is fixed by said stop means, and upon actuation of the brake, the opposed lever is rotated about its fixed pivot axis to tension the opposed end of said band in a self-actuating direction, around said drum.

22. The self-actuating band brake defined in claim 21, characterized in that said longer arms of said levers cross and said common link is located between said fixed pivot axes.

23. The self-actuating band brake defined in claim 22, characterized in that said levers are pivotally connected to said common link at spaced locations and said brake actuating means is pivotally connected to said common link between said spaced locations, permitting said common link to adjust angularly to compensate for the direction of braking.

24. The self-actuating band brake defined in claim 21, characterized in that said stop means comprises a pair of connector links which pivotally connect said levers to said common link and abut the opposed link, said connector links preventing rotation of said levers toward said drum.

25. The self-actuating band brake defined in claim 24, characterized in that said short lever arms include an extension beyond said fixed pivot axes which abut said connector links.

26. The self-actuating band brake defined in claim 21, characterized in said brake actuating means includes a brake rod pivotally connected at one end to said common link and said brake rod connected to a brake pedal linkage at the opposed end.

27. The self-actuating band brake defined in claim 26, characterized in that said brake pedal linkage includes a brake pedal link having a fixed pivot and pivotally connected to said brake rod spaced from said fixed pivot, whereby rotation of said brake pedal link tensions said rod, pulling said common link and tightening said brake band around the brake drum.

* * * * *